US011613056B2

(12) United States Patent
Wakayama et al.

(10) Patent No.: US 11,613,056 B2
(45) Date of Patent: Mar. 28, 2023

(54) MOLD, METHOD OF MANUFACTURING ARTICLE, AND VALVE

(71) Applicant: CANON KABUSHIKI KAISHA, Tokyo (JP)

(72) Inventors: Hiroki Wakayama, Kanagawa (JP); Toshiki Kobayashi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 29 days.

(21) Appl. No.: 17/125,722

(22) Filed: Dec. 17, 2020

(65) Prior Publication Data

US 2021/0197433 A1 Jul. 1, 2021

(30) Foreign Application Priority Data

Dec. 25, 2019 (JP) .............................. JP2019-235225

(51) Int. Cl.
B29C 45/26 (2006.01)

(52) U.S. Cl.
CPC ...... *B29C 45/26* (2013.01); *B29C 2045/2691* (2013.01)

(58) Field of Classification Search
None
See application file for complete search history.

(56) References Cited

U.S. PATENT DOCUMENTS

| 2,216,092 | A | * | 9/1940 | Northon | ................. | F16K 15/021 |
| | | | | | | 137/332 |
| 2007/0273060 | A1 | * | 11/2007 | Doyle | ................. | B29C 45/2806 |
| | | | | | | 700/200 |
| 2020/0179644 | A1 | * | 6/2020 | Guldbaek | ......... | A61M 25/0009 |
| 2021/0170656 | A1 | * | 6/2021 | Schmidt | ............. | B29C 45/7613 |

FOREIGN PATENT DOCUMENTS

| JP | 2001-018258 A | | 1/2001 |
| JP | 2003-071877 A | | 3/2003 |
| KR | 20170028554 A | * | 3/2017 |

* cited by examiner

*Primary Examiner* — Armand Melendez
(74) *Attorney, Agent, or Firm* — Canon U.S.A., Inc. IP Division

(57) ABSTRACT

A mold for reducing a molding cycle time and a cost, the mold including a first cavity and a second cavity includes a hot runner that is a flow path to inject a resin injected from an injection unit into the first cavity and the second cavity, and a switching valve configured to divide the flow path into a first flow path connected to the first cavity and a second flow path connected to the second cavity. The injection unit is connected to the first flow path. A pressurizing mechanism is connected to the second flow path.

14 Claims, 8 Drawing Sheets

PLUNGER SIDE

INJECTION UNIT SIDE

FIG.4B

PLUNGER SIDE

INJECTION UNIT SIDE

PLUNGER SIDE

INJECTION UNIT SIDE

MOLD, METHOD OF MANUFACTURING ARTICLE, AND VALVE

BACKGROUND

Field of the Disclosure

The present disclosure relates to a mold having a plurality of cavities, a method of manufacturing an article, and a valve.

Description of the Related Art

In injection molding, a resin melted inside a heated cylinder by using a screw, a plunger, etc. is supplied to a cavity in a mold, and a material is cooled and solidified in the mold. After solidification, the material is taken out from the mold by an ejector mechanism, etc. to obtain a desired molded article. Production is performed by repeating the above-described series of operation. Generally, in the injection molding, the production is performed by using a mold including one cavity or a plurality of cavities having the same shape. Unlike the above-described method, family molding in which the injection molding is performed by using a mold having a plurality of cavities having different shapes, is also performed.

In the family molding, since the shapes of the cavities are different from one another, it is necessary to determine an injection condition for each of the cavities. In particular, a dwell pressure among a plurality of injection conditions is a parameter that may cause warpage of the molded article, a sink mark, a weld line, filler floating, etc. which largely influence dimension accuracy and appearance. Therefore, a dwell pressure is desirably individually determined for each of the cavities.

The melted resin is filled from one injection unit included in a molding machine to the plurality of cavities through a resin flow path communicating with the plurality of cavities. Then, a dwell pressure is controlled by feedback control driving of the screw or the plunger of the injection unit through the communicating resin flow path. Consequently, pressures on the cavities cannot be controlled individually.

Therefore, in the family molding, a gate valve is disposed on a gate portion of each of the plurality of cavities of a mold including a hot runner, the melted resin is injected into one cavity by switching of the gate valves, and filling and dwell pressure application are performed at the necessary mold clamping force. In Japanese Patent Laid-Open No. 2003-71877, first, the gate valve disposed in a first cavity is opened, filling and dwell pressure application are performed on the first cavity, and the gate valve is then closed. Next, the gate valve of a second cavity is opened, the filling and the dwell pressure application are also performed on the second cavity, and the gate valve is then closed. A method of manufacturing molded articles formed in different shapes by sequentially performing molding with a time difference in the above-described manner has been discussed.

Further, there is a configuration in which a filled-resin pressure detection unit, a pressure holding unit, and a resin gate opening/closing unit are disposed in each of the cavities. All of the resin gates are opened before start of injection of the melted resin, and the resin gates of the respective cavities are individually closed based on stroke positions preset for the respective cavities in a filling process. Individual resin pressure signals obtained by detecting resin pressures in the respective cavities by the pressure detection units while the resin is in the melted state are fed back to the pressure holding units. A method of individually controlling pressures according to Japanese Patent Laid-Open No. 2001-18258 by which the pressures are controlled based on in-cavity resin pressure patterns preset for the respective cavities has been also discussed.

When the molding is sequentially performed in a stepwise manner by the method discussed in Japanese Patent Laid-Open No. 2003-71877, the molded articles cannot be taken out until solidification of the molded articles of all of the cavities are completed because the injection process and the dwell pressure application process are performed a plurality of times. Therefore, a cycle time is increased.

In the case of the method discussed in Japanese Patent Laid-Open No. 2001-18258, while the molding cycle time can be reduced because simultaneous application of dwell pressures is performable, the dwell pressures are controlled by the pressure holding units disposed on a part other than the resin gates after the resin gates are closed, which causes marks other than a gate mark to remain on an appearance of the molded article. Further, the unit does not apply the pressure from the gates through the resin flow path. Therefore, the structure for the pressure holding unit inside the mold is complicated, which increases the cost.

SUMMARY

According to an aspect of the present disclosure, a mold includes a first cavity and a second cavity, and the mold includes a hot runner that is a flow path to inject a resin injected from an injection unit, into the first cavity and the second cavity, and a switching valve configured to divide the flow path into a first flow path connected to the first cavity and a second flow path connected to the second cavity. The injection unit is connected to the first flow path. A pressurizing mechanism is connected to the second flow path.

According to another aspect of the present disclosure, a method of manufacturing an article by injecting a resin into a first cavity and a second cavity from an injection unit and applying dwell pressure, includes dividing, after filling the resin in the first cavity and the second cavity through a resin flow path, the resin flow path into a first resin flow path connected to the first cavity and a second resin flow path connected to the second cavity. In the first cavity, the dwell pressure is applied by injecting of the resin from the injection unit. In the second cavity, the dwell pressure is applied by injecting of the resin from a pressurizing mechanism connected to the second resin flow path. According to yet another aspect of the present disclosure, a valve includes a valve body housed in a housing. The valve body includes a first surface, a second surface, and an outer peripheral surface connecting the first surface and the second surface. The outer peripheral surface has a groove and projected portions forming a flow path with the housing. The first surface includes three or more protrusions.

Further features of various embodiments will become apparent from the following description of exemplary embodiments with reference to the attached drawings.

DESCRIPTION OF THE EMBODIMENTS

First Exemplary Embodiment

A first exemplary embodiment that is an example to which the present disclosure is applicable is described below with reference to drawings. FIGS. 1A to 1G are diagrams each illustrating an injection molding unit 1, an injection unit 2, a cylinder 3, and a screw 4. The cylinder 3 includes a heating unit. The injection unit 2 of the injection molding unit 1 melts a resin in a pellet state inside the cylinder 3, conveys and compresses the melted resin by a rotation operation of the screw 4, and injects the melted resin by an advancing operation of the screw 4. The injection molding unit 1 includes a mold clamping unit (not illustrated) to open/close a mold 10, and the mold 10 is attached to the mold clamping unit.

Figure 1A:
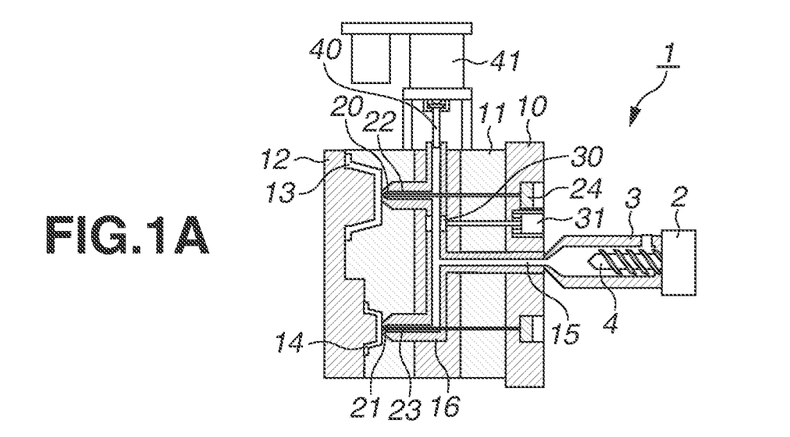
FIGS. 1A to 1G are cross-sectional views each illustrating a mold and an injection molding unit according to a first exemplary embodiment.

The mold 10 includes a fixed mold 11 and a movable mold 12, and the movable mold 12 can be advanced and retreated by the mold clamping unit. The fixed mold 11 and the movable mold 12 are brought into contact with each other at an advancing limit to form a cavity having a molded article shape. The mold 10 has two cavities having different shapes, and the two cavities are a first cavity 13 having a large volume and a second cavity 14 having a small volume. The resin melted and injected by the injection unit 2 is filled in the first cavity 13 and the second cavity 14 through a resin flow path 15. The resin flow path 15 is disposed inside a hot runner 16 in the fixed mold 11.

A first gate valve 22 is disposed in a first gate 20 that is a coupling portion of the first cavity 13 and the resin flow path 15. Filling start timing and filling end timing of the resin flowing from the resin flow path 15 into the first cavity 13 can be controlled by an opening/closing operation of the first gate valve 22. The first gate valve 22 is controlled by a gate valve control unit 24. A second gate valve 23 is disposed in a second gate 21 that is a coupling portion of the second cavity 14 and the resin flow path 15. Filling start timing and filling end timing of the resin flowing from the resin flow path 15 into the second cavity 14 can be controlled by an opening/closing operation of the second gate valve 23. The second gate valve 23 may be controlled by the gate valve control unit 24 like the first gate valve 22, or may be controlled by the other gate valve control unit 25.

A resin flow path switching valve 30 is disposed in the resin flow path 15 connecting the first cavity 13 and the second cavity 14. The resin flow path 15 connecting the first cavity 13 and the second cavity 14 can be made open or be divided by an opening/closing operation of the resin flow path switching valve 30. The resin flow path switching valve 30 is controlled by a resin flow path switching valve control unit 31.

A release port of the resin flow path 15 inside the hot runner 16 is disposed on each of an installation surface of the cylinder 3, the first gate 20 of the first cavity 13, the second gate of the second cavity 14, and another position. A pressurizing unit (or pressurizing mechanism) 40, such as a plunger, is inserted into the release port at the other position of the resin flow path 15. The pressurizing unit 40 is coupled to a pressure control unit 41, and can perform an advancing operation and a retreating operation. The resin is filled in the first cavity 13 and the second cavity 14 of the mold 10, and the dwell pressure is applied to the mold. As a result, an article is manufactured.

The mold and a method of manufacturing an article by using the mold according to the first exemplary embodiment are described with reference to FIGS. 1A to 1G.

Figure 1B:
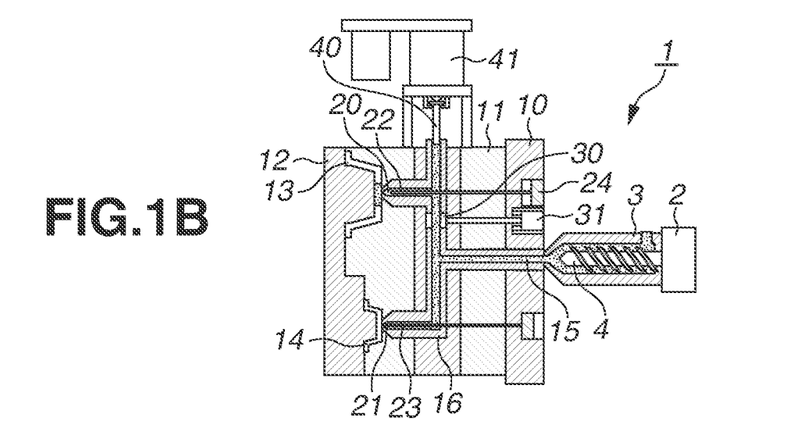
Figure 1C:
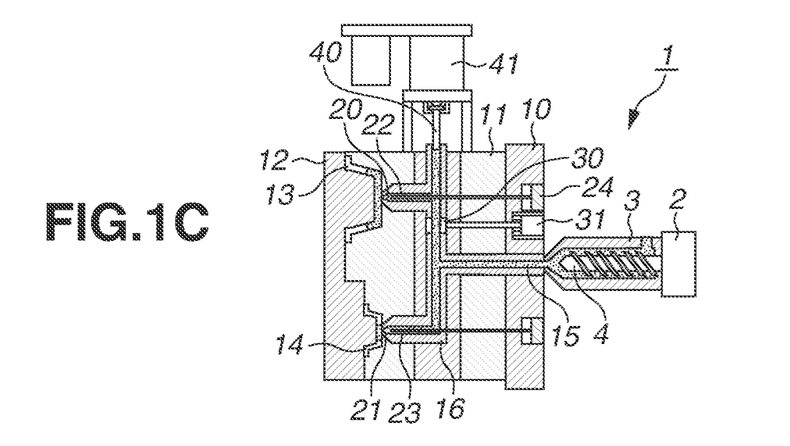

The resin in a pellet state is put in the injection unit 2 of the injection molding unit 1 illustrated in FIG. 1A, and is melted inside the cylinder 3. The melted resin is conveyed and compressed by the rotation operation of the screw 4. After the fixed mold 11 and the movable mold 12 of the injection molding unit 1 are brought into contact with each other by the mold clamping unit (not illustrated), the screw 4 of the injection unit 2 is advanced, and the melted resin accumulated in the cylinder 3 starts to flow through the resin flow path 15 of the hot runner 16. Then, as illustrated in FIG. 1B, the first gate valve 22 of the first cavity 13 having the large volume is retreated to open the first gate 20, and the resin starts to fill in the first cavity 13. As illustrated in FIG. 1C, at timing when an unfilled volume of the first cavity 13 and the volume of the second cavity 14 become equal to each other, the second gate valve 23 of the second cavity 14 is retreated. As a result, the second gate 21 is opened, and the resin starts to fill in the second cavity 14. Then, the resin starts to fill in the first cavity 13 and the second cavity 14 at the same time. The first gate valve 22 and the second gate valve 23 may be operated at the same time, and the resin may start to fill in the first cavity 13 and the second cavity 14 at the same time. However, shifting the operation timing of the first gate valve 22 and the operation timing of the second gate valve 23 makes it possible to prevent resin pressure that is more than necessary from being applied to the second cavity 14 having the small volume.

Figure 1D:
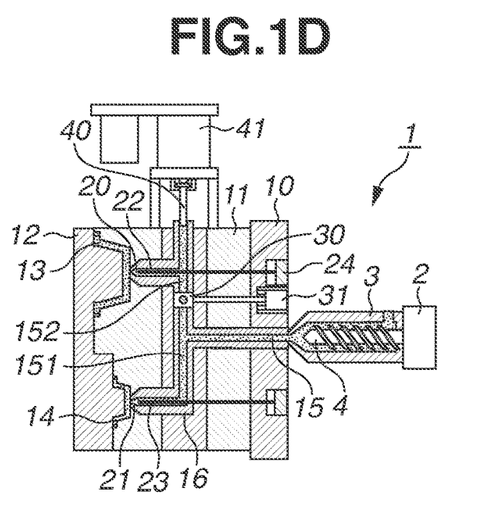
Figure 1E:
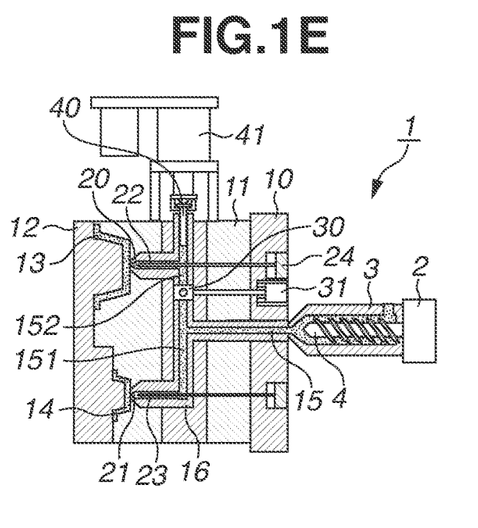

Immediately before the resin is filled up to ends of the two cavities, the resin flow path switching valve 30 is operated by the resin flow path switching valve control unit 31 to block the resin flow path 15 connecting the first cavity 13 and the second cavity 14, as illustrated in FIG. 1D. In the present disclosure, this state is referred to as closing of the switching valve. When the switching valve is closed, the resin flow path 15 is divided into a first resin flow path 151 and a second resin flow path 152. Even after the resin flow path 15 is divided, the injection unit 2 of the injection molding unit 1 is connected to the second resin flow path 152, as illustrated in FIG. 1E. Therefore, the dwell pressure to the second cavity 14 can be controlled by advancing the screw 4. In this operation, the screw 4 is operated by pressure feedback control of the injection unit 2. Meanwhile, the first resin flow path 151 divided inside the hot runner 16 is connected to the pressurizing unit 40. Therefore, in the first cavity 13, the dwell pressure of the resin accumulated in the first resin flow path 151 divided inside the hot runner 16 can be controlled by advancing and retreating the pressurizing unit 40. The pressurizing unit 40 is operated by pressure feedback control of the pressure control unit 41 coupled to the pressurizing unit 40. The dwell pressure to each of the cavities is controlled with a preset pressure value for a preset time. After lapse of a dwell pressure application time for each of the cavities, the first gate 20 and the second gate 21 are closed by advancing the first gate valve 22 and the second gate valve 23, respectively. While the dwell pressure is desirably controlled by feedback control, the dwell pressure may be controlled by the other control method.

Figure 1F:
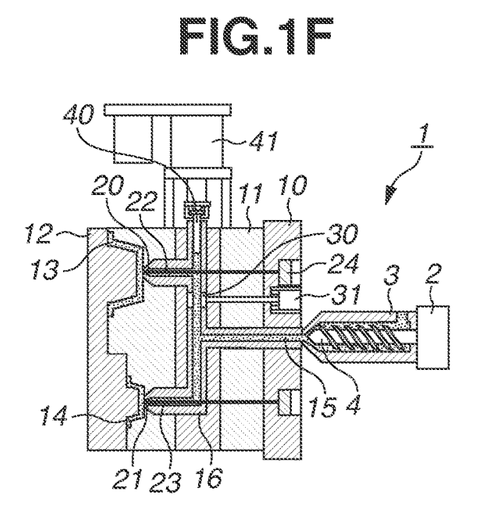
Figure 1G:
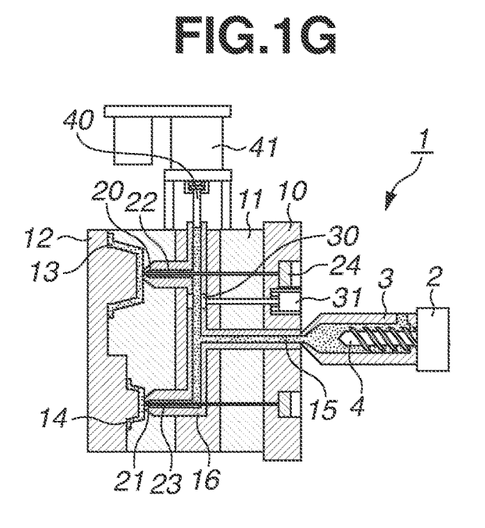

After the dwell pressure control for both of the two cavities is completed, the molded articles are completed, and manufacture of the articles ends. After completion of the dwell pressure control, the resin flow path switching valve 30 is operated to make the resin flow path 15, which was divided into the first resin flow path 151 and the second resin flow path 152, communicate again as illustrated in FIG. 1F. In the present specification, this state is referred to as opening of the switching valve. Subsequently, the resin used for molding in the next shot is plasticized by the screw 4. As illustrated in FIG. 1G, when the screw 4 is rotated by the injection unit 2, the resin pellets inside the cylinder 3 are conveyed to the front side of the screw 4 and are melted at the same time. Further, when the screw 4 is retreated, the resin for filling and dwell pressure application for the first cavity 13 and the resin for filling and dwell pressure application for the second cavity 14 in the next shot are measured on the front side of the screw 4 in the cylinder 3. In this operation, since the resin flow path switching valve 30 is opened, the resin pressure is applied to a front end of the pressurizing unit 40 by the resin conveyed to the front side in the cylinder 3. By retreating the pressurizing unit 40 by the pressure control unit 41 at the same time when the plasticization is performed by the injection unit 2, the resin for dwell pressure application to be used in the next shot in the resin flow path 15 of the hot runner 16 for the first cavity 13 can be measured.

After the above-described operation, the mold is opened after the lapse of a cooling time, and the molded articles are taken out from the cavities. Then, the mold clamping and the filling process for the next shot are started.

As described above, according to the first exemplary embodiment, the resin flow path switching valve 30 is operated to block the resin flow path 15 of the hot runner 16. As a result, the resin flow path 15 connected to the two cavities can be divided into the first resin flow path 151 and the second resin flow path 152 only at the time of the dwell pressure application process. In this state, the injection unit 2 is used for one of the cavities (second cavity), and the pressurizing unit 40 and the pressure control unit 41 are used for the other cavity (first cavity). This makes it possible to control the dwell pressure and the action time individually for the cavities. As a result, the molding cycle time can be reduced. Moreover, since the resin is filled in the two cavities by the injection unit 2, only the dwell pressure application control by the pressurizing unit 40 is performed on the first cavity 13. As a result, a stroke amount of the pressurizing unit 40 is reduced, which allows for downsizing of the pressurizing unit 40 and the pressure control unit 41, and realizes cost reduction.

While, in the present exemplary embodiment, the example in which the mold has the two cavities has been described, the number of cavities is not limited thereto, and the mold may have three or more cavities. In other words, the dwell pressure to one of all of the cavities is controlled by the injection unit of the molding machine, and the dwell pressures to the other cavities are controlled by respective pressure control units. This makes it possible to reduce the molding cycle time and to simplify the mold, and therefore the cost can be reduced.

First Example

An example of the first exemplary embodiment is described. The injection molding unit 1 had mold clamping force of 180 t, an injection volume of 160 cc, and a screw diameter of φ36. The injection unit 2 had a load cell, and the resin pressure applied to the screw 4 was feedback-controlled by driving of the screw 4 in a front-rear direction. The mold 10 had the two cavities. The first cavity 13 had a volume of 60 cc, and the second cavity 14 had a volume of 30 cc. The fixed mold 11 of the mold 10 had the hot runner 16, and the resin flow path 15 had a diameter of φ8. A first gate valve was disposed in a gate of the first cavity 13, and a second gate valve was disposed in a gate of the second cavity 14. A valve pin was used for the gate valve. The valve pin was coupled to a cylindrical piston processed for the fixed mold 11. The gate valve control unit 24 had a configuration in which compressed air was sent to the cylinder to advance or retreat the piston and the valve pin coupled to the piston.

A volume difference (30 cc in present example) between the first cavity 13 and the second cavity 14 was previously determined. In addition, timing when the resin was injected only in the first cavity 13 having the large volume and an unfilled volume of the first cavity 13 became equal to the volume of the second cavity was previously determined. The timing might be a time after the resin started to be injected in the first cavity 13 (after first valve gate was retreated) or might be determined from an injection amount of the resin (position of screw 4).

The resin flow path switching valve 30 in a rotary style was installed in the resin flow path 15 connecting the first cavity 13 and the second cavity 14. The resin flow path switching valve 30 in a rotary style had a through hole having a diameter same as the diameter of the resin flow path 15, at a center on a columnar shape. When the resin flow path switching valve 30 was rotated by 90 degrees, the resin flow path 15 was opened (made to communicate). When the resin flow path switching valve 30 was returned, the resin flow path 15 was blocked. The resin flow path switching valve 30 was coupled to the resin flow path switching valve control unit 31, and a rotary air cylinder was used as the resin flow path switching valve control unit 31.

The diameter of the pressurizing unit 40 was set to 0, which was the same as the diameter of the resin flow path 15 of the hot runner 16. The pressurizing unit 40 was coupled to the pressure control unit 41. A servo press including a servo motor and a ball screw was used for the pressure control unit 41. An output of the servo motor was set to 3.5 kW, and the ball screw had a diameter of φ32. A load cell to measure back pressures at dwell pressure application and plasticization was disposed in the servo press, and the operation of the pressurizing unit 40 was feedback-controlled based on these pressure values.

Next, a processes of an injection molding method performed as the example are described. Polystyrene was used as the resin, and temperature of the cylinder 3 and the hot runner 16 was set to 230° C. A measurement position of the screw 4 was set to 100 mm. After the resin melted at the measurement position, the screw 4 was advanced at injection speed of 50 mm/seconds. Then, the first gate valve 22 was retreated to open only the first gate 20 of the first cavity 13 having the large volume. The resin was injected into the first cavity 13. At timing when the unfilled volume of the first cavity 13 became 30 cc (timing when the screw 4 advanced at a position from measurement position by 3.3 mm), the second gate valve 23 was retreated. As a result, the second gate 21 of the second cavity 14 was opened, and the resin was also injected into the second cavity 14. The position of the screw 4 (position from measurement position by 10 mm) immediately before the resin reached the ends of the two cavities was previously determined, and the position was defined as a switching position of the resin flow path switching valve 30 (which is defined as a timing when resin flow path 15 was blocked by switching valve).

At the same time when the screw 4 reached the position from the measurement position by 10 mm, the resin flow path switching valve 30 was operated and rotated by 90 degrees such that the resin flow path switching valve 30 was directed to block the resin flow path 15. When the resin flow path switching valve 30 blocked the resin flow path 15, the resin flow path 15 was divided into the first resin flow path 151 and the second resin flow path 152. Then, the dwell pressure was applied to the second cavity 14 by the injection unit 2. The dwell pressure was set to 40 MPa, and the action time was set to 2 seconds. At the same time, the pressurizing unit 40 was advanced to apply pressure to the resin accumulated in the first resin flow path 151 of the hot runner 16, and the dwell pressure to the first cavity 13 having the large volume was controlled. The dwell pressure was set to 80 MPa, and the action time was set to 3 seconds. An advancing amount of the pressurizing unit 40 from the measurement position caused by application of the dwell pressure of 80 MPa to the first cavity 13 for 3 seconds was 18 mm.

At the same time when the dwell pressure application to the second cavity 14 was completed, the second gate valve 23 was advanced to close the second gate 21. After 3 seconds from start of the dwell pressure application to the first cavity 13 (after 1 second from completion of dwell pressure application to second cavity 14), the first gate valve 22 of the first cavity 13 was advanced to close the first gate 20. At the same time when the dwell pressure application to the first cavity 13 was completed, the resin flow path switching valve 30 was rotated by 90 degrees to make the first resin flow path 151 and the second resin flow path 152 communicate with each other.

Next, the screw 4 was rotated at 100 rpm to plasticize the resin for the next injection molding. In this operation, the back pressure of the injection unit 2 was set to 5 MPa. The screw 4 was feedback-controlled and operated by the injection unit 2 to maintain the resin pressure inside the resin flow path 15 at 5 MPa. Meanwhile, the back pressure of the pressurizing unit 40 was also set to 5 MPa. Since the pressure was applied to the resin inside the resin flow path 15 by rotation of the screw 4, the pressurizing unit 40 was feedback-controlled and operated by the pressure control unit 41 such that the pressure applied to the pressurizing unit 40 became 5 MPa. A position where the front end of the pressurizing unit 40 came out from the resin flow path 15 of the hot runner 16 was defined as a retreating limit, and the maximum stroke amount was set to 30 mm. The pressurizing unit 40 was controlled to stop at the position of 20 mm from the retreating limit.

While the foregoing disclosure describes a method in which the dwell pressure is applied to the first cavity, and the dwell pressure is then applied to the second cavity, different dwell pressures (e.g., 80 MPa and 40 MPa) can be simultaneously applied to the first cavity and the second cavity. This makes it possible to reduce the cycle time in manufacturing articles. In addition, since the pressure can be controlled from the resin flow path of the hot runner through the gates of the cavities, it is unnecessary to dispose a structure other than the gates to apply the dwell pressures to the cavities, which makes it possible to prevent the cost from increasing.

Second Exemplary Embodiment

Figure 2A:
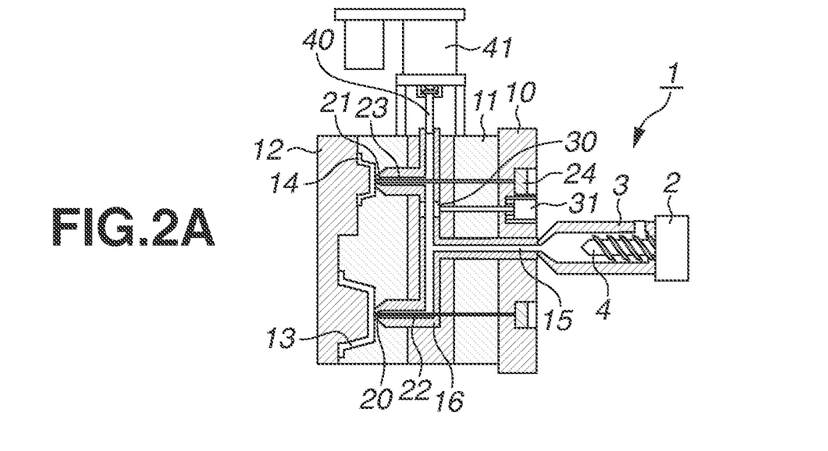
FIGS. 2A, 2B, and 2C are cross-sectional views each illustrating a mold and an injection molding unit according to a second exemplary embodiment.
Figure 2B:
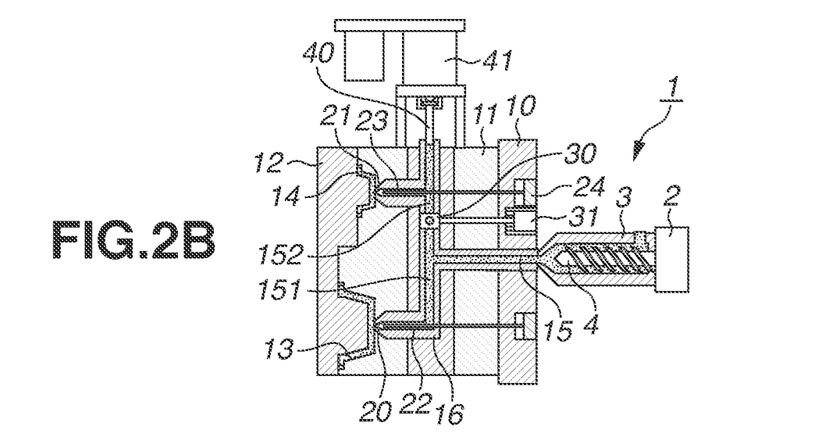
Figure 2C:
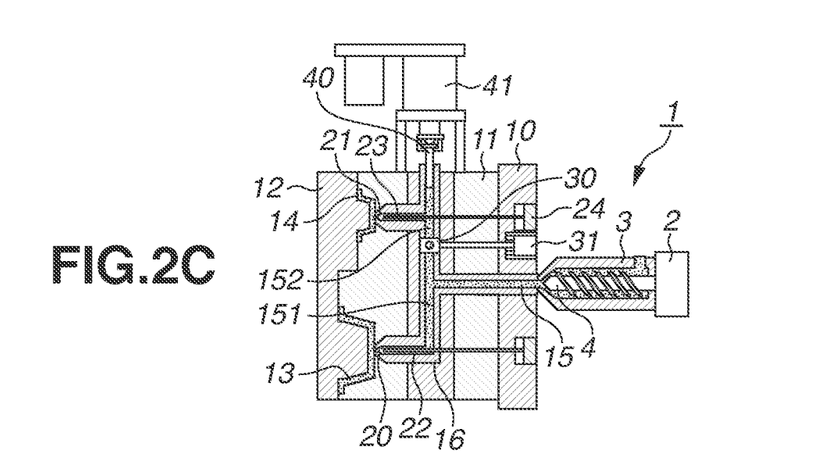

A mold and a method of manufacturing an article according to a second exemplary embodiment are described with reference to FIGS. 2A, 2B, and 2C. As illustrated in FIG. 2A, the second exemplary embodiment is different in the positions of the cavities of the mold 10 from the first exemplary embodiment. An example in which the positions of the first cavity 13 and the second cavity 14 are inverted from the positions in the first exemplary embodiment is described. In other words, the dwell pressure of the first cavity 13 that has the large volume and is higher in dwell pressure than the second cavity 14 is controlled by the injection unit 2 of the injection molding unit 1. In contrast, the dwell pressure of the second cavity 14 that has the small volume and is lower in dwell pressure than the first cavity 13 is controlled by the pressurizing unit 40 and the pressure control unit 41. In FIGS. 2A, 2B, and 2C, members having the same configurations in FIGS. 1A to 1G are denoted by the same reference numerals, and redundant descriptions of the members are omitted.

Next, the method of manufacturing an article by using the mold according to the second exemplary embodiment of the present disclosure is described by focusing on differences from the first exemplary embodiment.

Immediately before the resin is filled up to the ends of the two cavities, the resin flow path switching valve 30 is operated by the resin flow path switching valve control unit 31 to block the resin flow path 15 connecting the first cavity 13 and the second cavity 14, as illustrated in FIG. 2B. In the present specification, this state is referred to as closing of the switching valve. The resin flow path 15 is divided into the first resin flow path 151 and the second resin flow path 152. Even after the resin flow path 15 is divided, the injection unit 2 of the injection molding unit 1 is connected to the first resin flow path 151, as illustrated in FIG. 2C. Therefore, the dwell pressure to the first cavity 13 can be controlled by advancing the screw 4. In this operation, the screw 4 is operated by the pressure feedback control of the injection unit 2. Meanwhile, the second resin flow path 152 divided inside the hot runner 16 is connected to the pressurizing unit 40. Therefore, in the second cavity 14, the dwell pressure of the resin accumulated in the second resin flow path 152 divided inside the hot runner 16 can be controlled by advancing and retreating the pressurizing unit 40. The pressurizing unit 40 is operated by the pressure feedback control of the pressure control unit 41 coupled to the pressurizing unit 40. The dwell pressure to each of the cavities is controlled with a preset pressure value for a preset time. After a lapse of the dwell pressure application time for each of the cavities, the first gate 20 and the second gate 21 are closed by advancing the first gate valve 22 and the second gate valve 23, respectively. While the dwell pressure is desirably controlled by feedback control, the dwell pressure may be controlled by the other method.

After the dwell pressure application control for both of the two cavities is completed, the molded articles are completed, and manufacture of the articles ends. After completion of the dwell pressure application control, the resin flow path switching valve 30 is operated to make the resin flow path, which had been divided into the first resin flow path 151 and the second resin flow path 152, communicate again. In the present specification, this state is referred to as opening of the switching valve. Subsequently, the resin used for molding in next shot is plasticized by the screw 4.

Then, the mold is opened after lapse of the cooling time, and the molded articles are taken out from the cavities. Then, the mold clamping and the filling process for the next shot are started.

As described above, according to the second exemplary embodiment, it is possible to use the injection unit 2 of the injection molding unit 1 for the cavity requiring large dwell pressures. In contrast, using the pressure control unit 41 for the cavity requiring low dwell pressures enables lowering of the specification of the pressure control unit 41, which makes it possible to reduce the cost. Furthermore, when the required dwell pressure is low, the stroke amount of the pressurizing unit 40 can be reduced. Accordingly, it is possible to downsize the pressure control unit 41 and to reduce the cost.

While, in the present exemplary embodiment, the example in which the mold has the two cavities has been described, the number of cavities is not limited thereto, and the mold may have three or more cavities. In this case, the dwell pressure to a cavity requiring the highest dwell pressure among all of the cavities is controlled by the injection unit of the molding machine, and the dwell pressures to the other cavities are controlled by respective pressure control units. This makes it possible to reduce the cost of the pressure control unit.

Second Example

An example of the second exemplary embodiment is described. While the shapes of the two cavities of the mold 10 were the same as the shapes of the two cavities in the first example, the dwell pressure was applied to the first cavity 13 requiring high dwell pressures by the injection unit 2 of the injection molding unit 1. Meanwhile, the dwell pressure to the second cavity 14 requiring low dwell pressures was controlled by the pressurizing unit 40 and the pressure control unit 41. An output of the servo motor of the pressure control unit 41 was set to 2 kW, and the ball screw had a diameter of φ28. The other configurations were the same as the configurations in the first example.

Processes of the performed injection molding method are described.

As in the first example, the measurement position of the screw 4 was set to 100 mm. After the resin was melted at the measurement position, the screw 4 was advanced at injection speed of 50 mm/s. At the same time of advancing, the first gate valve 22 was retreated to open only the first gate 20 of the first cavity 13 having the large volume, and the resin was injected only into the first cavity 13. At timing when the unfilled volume of the first cavity 13 became 30 cc (timing when the screw 4 is advanced to a position from measurement position by 3.3 mm), the second gate valve 23 was retreated. As a result, the second gate 21 of the second cavity 14 was opened, and the resin was also injected into the second cavity 14. The position of the screw 4 (position from measurement position by 10 mm) immediately before the resin reached the ends of the two cavities was previously determined, and the position was defined as a switching position of the resin flow path switching valve 30 (as a timing when resin flow path 15 was blocked by switching valve). At the same time when the screw 4 reached the position from the measurement position by 10 mm, the resin flow path switching valve 30 was operated and rotated by 90 degrees such that the resin flow path switching valve 30 was directed to block the resin flow path 15 as illustrated in FIG. 2B. When the resin flow path switching valve 30 blocked the resin flow path 15, the resin flow path 15 was divided into the first resin flow path 151 and the second resin flow path 152. Then, the dwell pressure was applied to the first cavity 13 by the injection unit 2. The dwell pressure was set to 80 MPa, and the action time was set to 3 seconds. At the same time, the pressurizing unit 40 was advanced to apply pressure to the resin accumulated in the second resin flow path 152 of the hot runner 16, and the dwell pressure to the second cavity 14 having the small volume was controlled. The dwell pressure was set to 40 MPa, and the action time was set to 2 seconds. The advancing amount of the pressurizing unit 40 from the measurement position caused by application of the dwelling pressure of 40 MPa to the second cavity 14 for 2 seconds was 8 mm.

At the same time when the dwell pressure application to the second cavity 14 was completed, the second gate valve 23 was advanced to close the second gate 21. After 3 seconds from the start of the dwell pressure application to the first cavity 13 (after 1 second from completion of dwell pressure application to the second cavity 14), the first gate valve 22 of the first cavity 13 was advanced to close the first gate 20. At the same time when the dwell pressure application to the first cavity 13 was completed, the resin flow path switching valve 30 was rotated by 90 degrees to make the first resin flow path 151 and the second resin flow path 152 communicate with each other.

Next, the screw 4 was rotated at 100 rpm to plasticize the resin for the next injection molding. In this operation, the back pressure of the injection unit 2 was set to 5 MPa. The screw 4 was feedback-controlled and operated by the injection unit 2 to maintain the resin pressure inside the resin flow path 15 at 5 MPa. Meanwhile, the back pressure of the pressurizing unit 40 was also set to 5 MPa. Since the pressure was applied to the resin inside the resin flow path 15 by rotation of the screw 4, the pressurizing unit 40 was feedback-controlled and operated by the pressure control unit 41 such that the pressure applied to the pressurizing unit 40 became 5 MPa. In the first example, the position where the front end of the pressurizing unit 40 came out from the resin flow path 15 of the hot runner 16 was defined as the retreating limit, the maximum stroke amount was set to 30 mm, and the pressurizing unit 40 was controlled to stop at the position of 20 mm from the retreating limit. In contrast, in the present example, the maximum stroke amount was set to 15 mm, and the pressurizing unit 40 was controlled to stop at the position of 10 mm from the retreating limit.

As described above, using the pressurizing unit 40 and the pressure control unit 41 for the second cavity 14 that had the small volume and required low dwell pressures enables lowering the specification of the pressure control unit 41, which made it possible to reduce the cost. Further, since the advancing amount of the pressurizing unit 40 for dwell pressure application to the second cavity 14 was also reduced. This leaded to downsizing of the pressure control unit and reduction in the cost.

Third Exemplary Embodiment

A mold and a method of manufacturing an article according to a third exemplary embodiment are described with reference to FIGS. 3A to 7C. The third exemplary embodiment is different in the resin flow path switching valve 30 (see FIGS. 2A, 2B, and 2C) from the second exemplary embodiment. In FIGS. 3A to 7C, members having the same configurations according to the second exemplary embodiment are denoted by the same reference numerals, and redundant descriptions of the members are omitted.

Figure 4A:
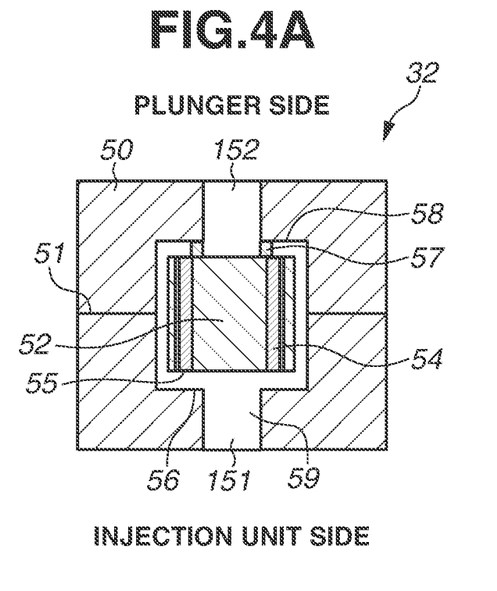
FIGS. 4A to 4D are schematic views each illustrating a resin flow path switching valve according to the third exemplary embodiment.
Figure 4B:
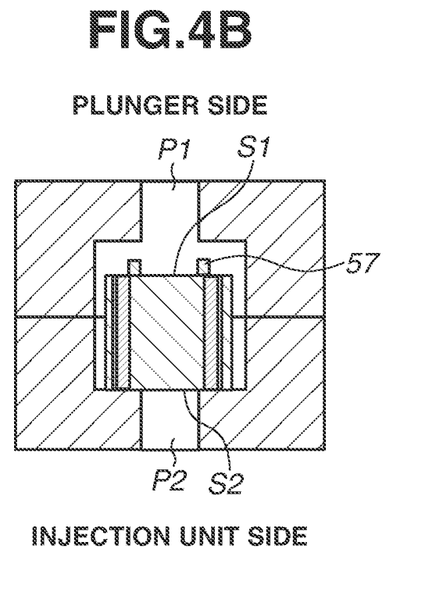
Figure 4C:
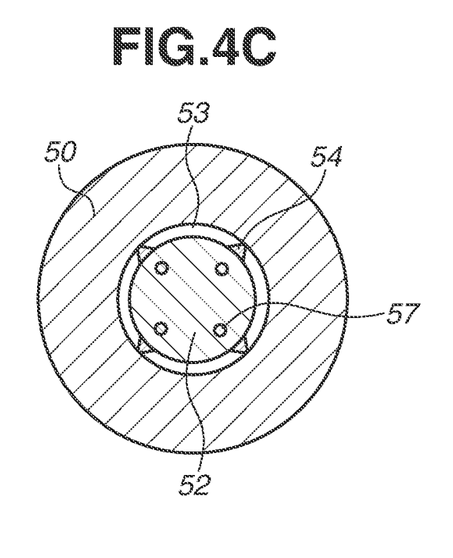
Figure 4D:
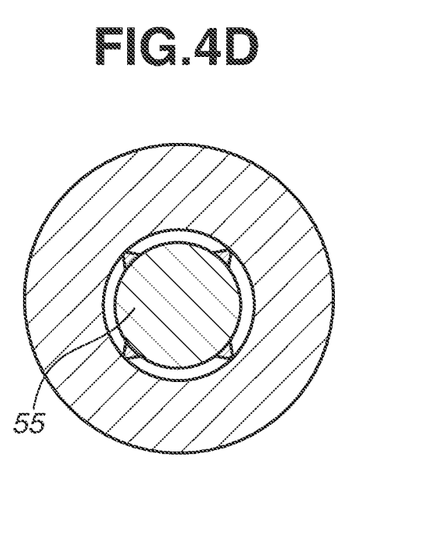

A resin flow path switching valve 32 (FIG. 3A) according to the third exemplary embodiment is described. FIGS. 4A to 4D each illustrate the resin flow path switching valve 32 incorporated in the resin flow path 15. FIG. 4A is a cross-sectional view when the resin flow path switching valve is opened, and FIG. 4B is a cross-sectional view when the resin flow path switching valve is closed. FIG. 4C illustrates a valve housing 50 and a valve body 52 when an injection unit side is viewed from a divided surface 51 of the valve housing 50, and FIG. 4D illustrates the valve housing 50 and the valve body 52 when a pressurizing unit 40 side is viewed from the divided surface 51 of the valve housing 50.

The valve body 52 of the resin flow path switching valve 32 is inserted (housed) into the valve housing 50, and can be freely advanced and retreated. A groove 53 and convex portions (projected portions) 54 are disposed on an outer peripheral surface of the valve body 52. When the valve is opened, the melted resin flows through the groove 53. The convex portions 54 are fitted to an inner surface of the valve housing 50 and serve as guides of the advancing/retreating operation of the valve body. To maintain stable valve body operation, three or more convex portions 54 are desirably disposed. The valve body 52 has a flat surface portion 55 on a valve-body surface (second surface) on the injection unit side. When the valve is closed, the flat surface portion 55 of the valve-body surface abuts on a flat surface portion (second surface) 56 of the valve housing on the injection unit side, and the flow path is closed. The valve body 52 has protrusions 57 on a valve-body surface (first surface) on the pressurizing unit side. When the valve is opened, the protrusions 57 abut on a flat surface portion (first surface) 58 of the valve housing on the pressurizing unit side, and the flow path is formed to pass through between the valve housing 50 and all of the groove 53 and the protrusions 57. To maintain the stable valve body operation, three or more protrusions 57 are desirably disposed.

In other words, the valve body includes the first surface, the second surface, and the outer peripheral surface connecting the first surface and the second surface, the outer peripheral surface includes the groove and the projected portions forming the flow path with the housing, and the first surface includes the three or more protrusions.

Further, the housing includes the first surface, the second surface, and the inner peripheral surface connecting the first surface and the second surface. When the protrusions are in contact with the first surface of the housing, a gap is formed between the second surface of the valve body and the second surface of the housing.

Next, an injection molding method using the resin flow path switching valve 32 according to the present exemplary embodiment is described.

Figure 3A:
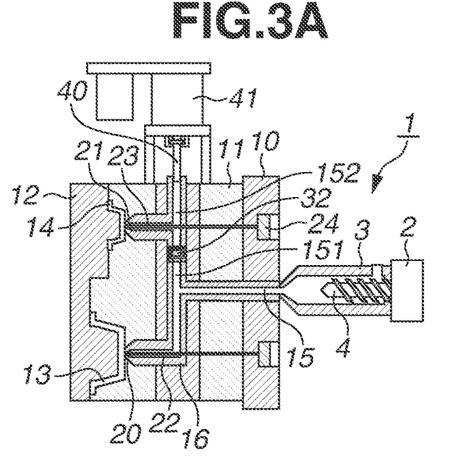
FIGS. 3A to 3F are cross-sectional views each illustrating a mold and an injection molding unit according to a third exemplary embodiment.
Figure 3B:
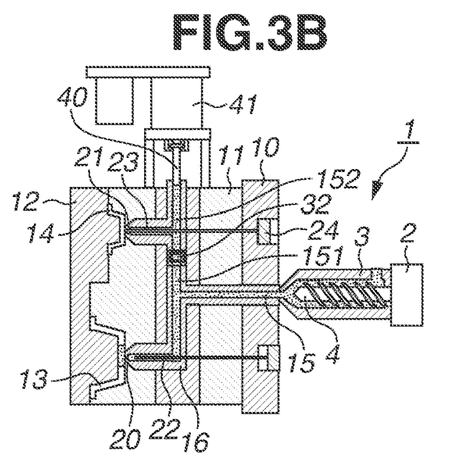

As in the second exemplary embodiment, after the fixed mold 11 and the movable mold 12 of the injection molding unit 1 are closed, the screw 4 of the injection unit 2 is advanced, and the melted resin accumulated in the cylinder 3 flows out to the resin flow path 15 of the hot runner 16. At the same time, as illustrated in FIG. 3B, the first gate valve 22 of the first cavity 13 having the large volume is retreated to open the first gate 20. As a result, the resin starts to fill only in the first cavity 13.

Figure 3C:
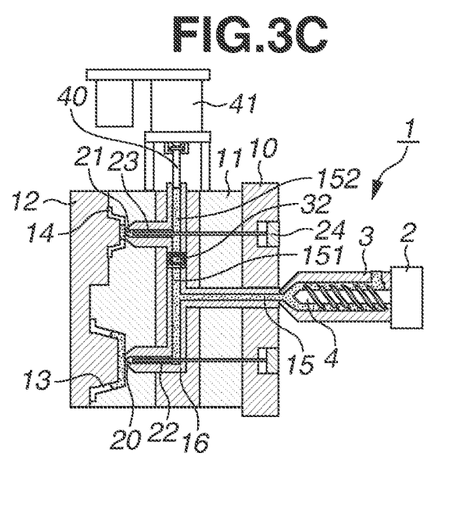

Further, as illustrated in FIG. 3C, at timing when the unfilled volume of the first cavity 13 and the volume of the second cavity 14 become equal to each other, the second gate valve 23 of the second cavity 14 is opened. As a result of the operation, the resin starts to fill in the first cavity 13 and the second cavity 14 at the same time. Shifting the operation timing of the first gate valve 22 and the operation timing of the second gate valve 23 makes it possible to prevent the application of resin pressure that is more than necessary from being applied to the second cavity 14 having the small volume. However, depending on a situation, the gate valves may be simultaneously operated to simultaneously open the two gates, or the second gate valve 23 of the second cavity 14 may be first retreated to open the second gate 21.

Figure 5:
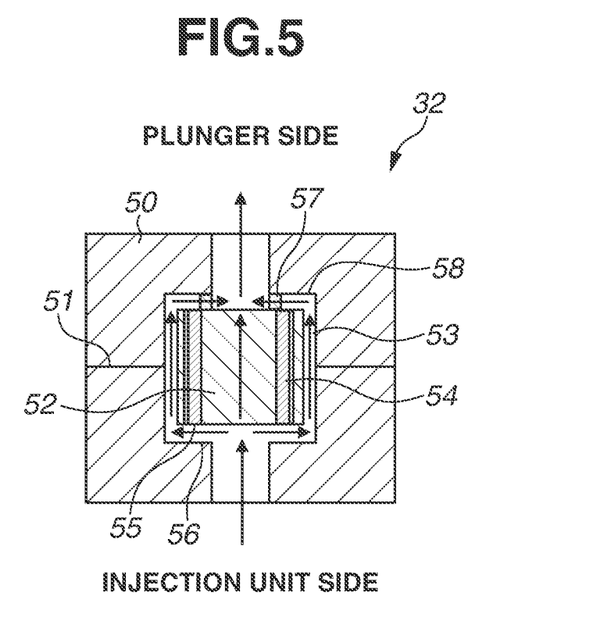
FIG. 5 is a schematic view illustrating the resin flow path switching valve according to the third exemplary embodiment.

FIG. 5 illustrates a state of the resin flow path switching valve 32 in the filling process. The melted resin injected from the injection unit 2 reaches the resin flow path switching valve 32 through the resin flow path 15 of the hot runner 16.

The valve body 52 of the resin flow path switching valve 32 moves toward the pressurizing unit 40 by being pushed by the flow of the melted resin, and the protrusions 57 abut on the flat surface portion 58 of the valve housing 50 on the pressurizing unit 40 side. As a result, the switching valve is opened, and the first resin flow path 151 on the injection unit side and the second resin flow path 152 on the pressurizing unit side of the resin flow path 15 communicate with each other. In the present disclosure, this state is referred to as opening of the switching valve. Arrows in FIG. 5 indicate the flow of the melted resin in the valve opened state. The melted resin flows through between the valve housing 50 and both of the groove 53 and the protrusions 57 of the valve body 52.

Figure 3D:
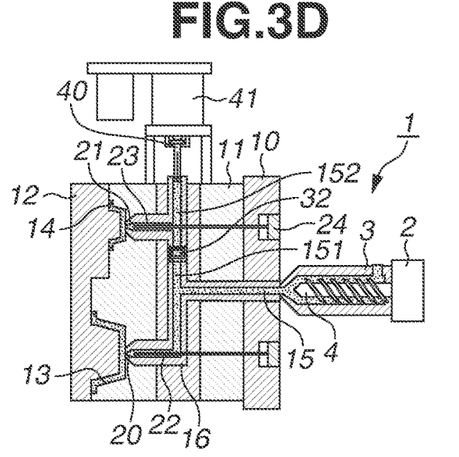
Figure 6A:
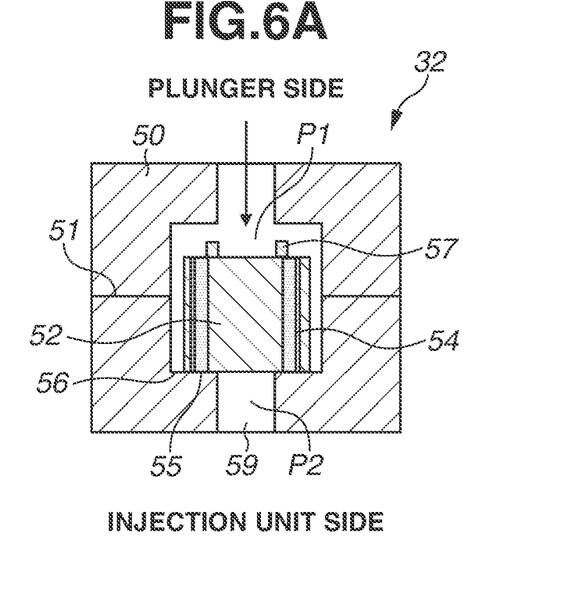
FIGS. 6A, 6B, and 6C are schematic views each illustrating the resin flow path switching valve according to the third exemplary embodiment.

Then, immediately before or immediately after the resin is filled up to the ends of the two cavities, injection of the melted resin by the injection unit 2 is suspended. Further, as illustrated in FIG. 3D, the pressurizing unit 40 is advanced. FIG. 6A illustrates the state of the resin flow path switching valve 32 in this operation. When the pressurizing unit 40 is advanced, the valve body 52 of the resin flow path switching valve 32 moves toward the injection unit by being pushed by the flow of the melted resin. As a result, the flat surface portion 55 of the valve-body surface abuts on the flat surface portion 56 of the valve housing 50 on the injection unit side to block the resin flow path 15. In the present disclosure, this state is referred to as closing of the switching valve. Further, the first resin flow path 151 on the injection unit side and the second resin flow path 152 on the pressurizing unit side are divided (flow path closing process). An arrow in FIG. 6A indicates the flowing direction of the melted resin in this process.

Figure 6B:
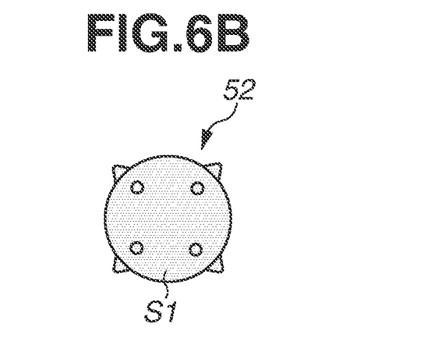
Figure 6C:
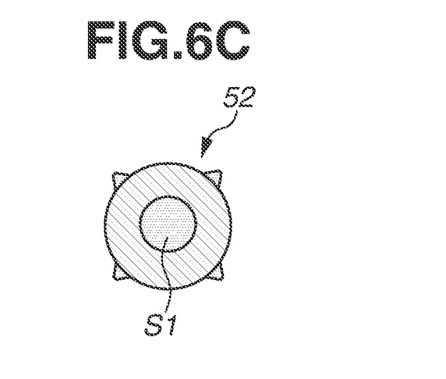

FIG. 6B illustrates the valve body 52 as viewed from the pressurizing unit side when the switching valve is closed, and FIG. 6C illustrates the valve body 52 as viewed from the injection unit side when the switching valve is closed.

When the resin flow path switching valve 32 according to the present exemplary embodiment is closed, a pressure receiving area of a pressure receiving surface that faces the second resin flow path 152 on the pressurizing unit side inside the hot runner 16, is perpendicular to a flow path axis direction of the valve body 52, and receives melted resin pressure P1 of the second resin flow path 152 on the pressurizing unit side, is defined as S1. A pressure receiving area of a pressure receiving surface that faces the first resin flow path 151 on the injection unit side inside the hot runner 16, is perpendicular to the flow path axis direction of the valve body 52, and receives melted resin pressure P2 of the first resin flow path 151 on the injection unit side, is defined as S2. The resin flow path switching valve 32 is designed to satisfy S1>S2. The pressure receiving area S1 can be set at any value based on setting of a diameter value of the valve body 52, and the pressure receiving area S2 can be set at any value based on setting of a diameter value of a valve hole 59 of the valve housing 50 on the injection unit side, etc. When the resin flow path switching valve 32 is closed, the resin flow path 15 connecting the first cavity 13 and the second cavity 14 is divided into the second resin flow path 152 on the pressurizing unit side and the first resin flow path 151 on the injection unit side.

Figure 3E:
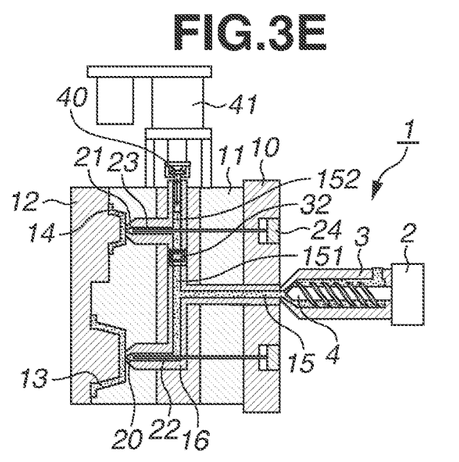

In the subsequent dwell pressure application process, as illustrated in FIG. 3E, the first resin flow path 151 is connected to the injection unit 2 of the injection molding unit 1 even after the resin flow path is divided. Therefore, the dwell pressure to the first cavity 13 can be controlled by advancing and retreating the screw 4. In this operation, the screw 4 is operated by the pressure feedback control of the injection unit 2. Meanwhile, when the resin flow path switching valve 32 is closed, the second resin flow path 152 divided from the resin flow path 15 is connected to the pressurizing unit 40. Therefore, in the second cavity 14, the dwell pressure of the resin accumulated in the second resin flow path 152 on the pressurizing unit side inside the hot runner 16 can be controlled by advancing and retreating the pressurizing unit 40. The pressurizing unit 40 is operated by the pressure feedback control of the pressure control unit 41 coupled to the pressurizing unit 40. The dwell pressure to each of the cavities is controlled with a preset pressure value for a preset dwell pressure application time.

In the dwell pressure application process, it is necessary to maintain the valve body 52 of the resin flow path switching valve 32 in the closed state. A condition to maintain the valve body of the resin flow path switching valve 32 in the closed state is represented by an expression of $P1 \times S1 \geq P2 \times S2$. Therefore, the dwell pressure value applied to the second cavity 14 by the pressurizing unit 40 and the dwell pressure value applied to the first cavity 13 by the injection unit 2 are set within a range where the expression is satisfied.

For example, in the case of the resin flow path switching valve 30 in which a ratio S1:S2 of the pressure receiving surfaces is designed to 3:1, the valve-body closing condition is represented by $P1 \geq P2/3$. In other words, any dwell pressure within the range is applicable to the first cavity 13 and the second cavity 14.

After lapse of the dwell pressure application time for each of the cavities, the gate is closed by operation of the gate valve. While the dwell pressure is desirably controlled by feedback control, the dwell pressure may be controlled by the other method.

Figure 3F:
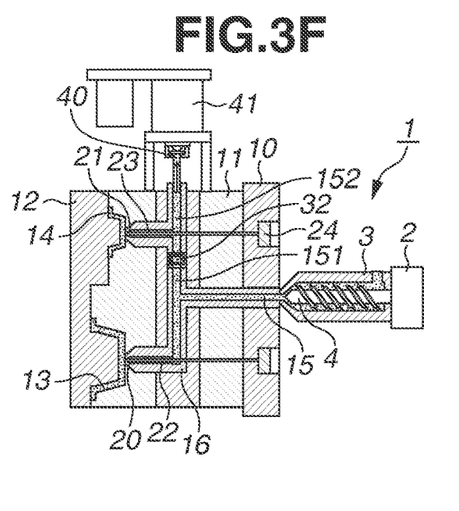

After the dwell pressure application control for the cavity having a long dwell pressure application time out of the two cavities is completed, and the cooling time elapses, the molded articles are completed, and manufacture of the articles ends. After completion of the dwell pressure application control, as illustrated in FIG. 3F, the pressurizing unit 40 is retreated. In the subsequent measurement process, when the injection unit 2 rotates the screw 4, the resin pellets in the cylinder 3 are conveyed to the front side of the screw 4, and melted (plasticized). Further, when the screw 4 is retreated, the resin is measured on the front side of screw 4 in the cylinder 3. The back pressure value is set for the injection unit 2 in the measurement, and the back pressure is applied to the melted resin inside the resin flow path 15 of the hot runner 16. As a result, a pressure difference occurs inside the resin flow path on the front side and the rear side of the valve body 52 of the resin flow path switching valve 32, and the switching valve is opened.

Figure 7A:
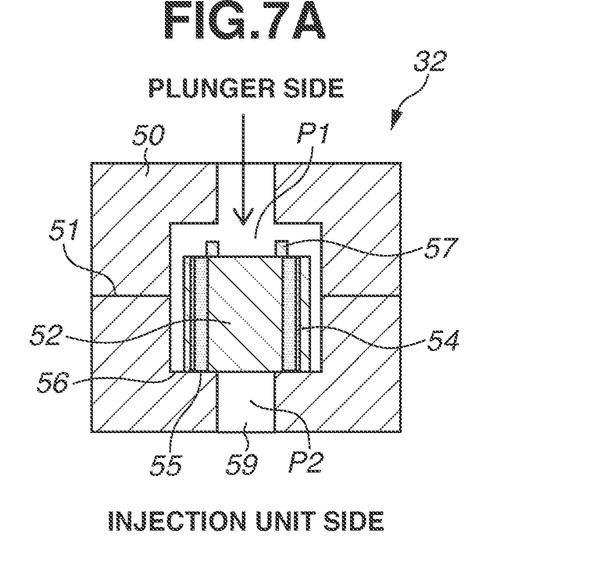
FIGS. 7A, 7B, and 7C are schematic views each illustrating the resin flow path switching valve according to the third exemplary embodiment.

The state of the resin flow path switching valve 32 in the flow path releasing process is described in detail with reference to FIGS. 7A, 7B, and 7C. An arrow in FIG. 7A illustrates the flowing direction of the melted resin in this operation.

Figure 7B:
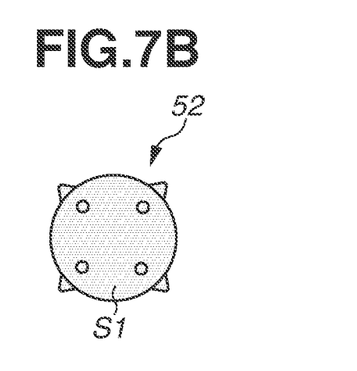
Figure 7C:
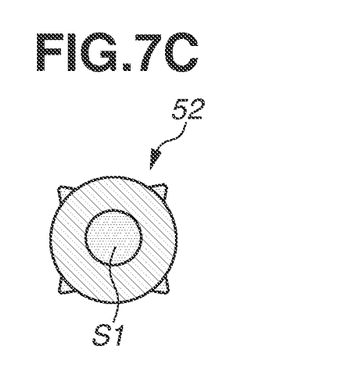

FIG. 7B is the valve body 52 as viewed from the pressurizing unit side when the switching valve is closed, and FIG. 7C illustrates the valve body 52 as viewed from the injection unit side when the switching valve is closed. A pressure receiving area of a pressure receiving surface that is perpendicular to the flow path axis direction of the valve body 52 and receives the melted resin pressure P1 of the second resin flow path 152 on the pressurizing unit side inside the hot runner 16, is defined as S1. Further, a pressure receiving area of a pressure receiving surface that is perpendicular to the flow path axis direction of the valve body 52 and receives the melted resin pressure P2 of the first resin flow path 151 on the injection unit side inside the hot runner 16, is defined as S2.

When the pressurizing unit 40 is retreated, the melted resin pressure P1 of the second resin flow path 152 on the pressurizing unit side inside the hot runner 16 is reduced. Meanwhile, applying the back pressure when the melted resin is measured by the screw 4 of the injection unit 2 makes it possible to make the melted resin pressure P2 of the first resin flow path 151 on the injection unit side larger than the melted resin pressure P1. When the values of the melted resin pressures P1 and P2 are adjusted to satisfy $P1 \times S1 < P2 \times S2$, the valve body 52 starts to operate in the resin filling direction of the cavity and the switching valve is opened.

After the switching valve is opened, the melted resin continuously flows into the second resin flow path 152 on the pressurizing unit side inside the hot runner 16 by the rotation of the screw 4 of the injection unit 2. In addition, the resin for filling of the second cavity 14 and the resin for filling of the first cavity 13 for the next shot are measured, and the resin for dwell pressure of the pressurizing unit is further measured by setting the retreating amount of the pressurizing unit (measurement amount of pressurizing unit). The pressurizing unit is retreated by pressure control or position control of the pressurizing unit 40 by the pressure control unit 41, or a combination of the position control and the pressure control. Further, the advancing operation may be performed in the middle of the retreating operation.

After the dwell pressure application control by the injection unit 2 is completed, and the cooling time elapses, the mold is opened and the molded articles are taken out. Then, clamping of the mold and the filling process for the next shot are started.

In the above-described exemplary embodiment, the shapes and the number of cavities are not limited, and a plurality of cavities receiving the dwell pressure from the pressurizing unit 40 may be disposed, or a plurality of cavities receiving the dwell pressure from the injection unit 2 may be disposed.

As described above, according to the third exemplary embodiment, the resin flow path switching valve 32 is disposed in the resin flow path 15 of the hot runner 16, which makes it possible to divide the resin flow path 15 connected to the two cavities only in the dwell pressure application process. In this state, the injection unit 2 is used for one of the cavities, and the pressurizing unit 40 and the pressure control unit 41 are used for the other cavity. This makes it possible to control the dwell pressure and the action time individually for each of the cavities. As a result, it is possible to reduce the molding cycle time. Further, since the resin flow path switching valve does not require an external driving unit, it is possible to downsize the valve, which is excellent in manufacturing cost. In addition, failure such as resin leakage does not occur because the valve does not include a sliding portion communicating with the outside of the hot runner. Further, the dwell pressure value of the cavity on the pressurizing unit side and the dwell pressure value of the cavity on the injection unit side can be set at any values within a dwell pressure application condition range necessary for the typical injection condition. Therefore, even in a case where the dwell pressure values of the respective cavities are unknown at the time of designing the mold, it is possible to design and manufacture the mold.

In addition, since the valve body 52 of the resin flow path switching valve 32 according to the present exemplary embodiment is fitted to the valve housing 50 at apexes of the convex portions 54, a galling defect hardly occurs. Further, when the valve is closed, the groove 53 and the protrusions 57 can cause the melted resin to flow along the outer peripheral surface of the valve body 52, which makes it possible to prevent stagnation deterioration of the resin.

Third Example

An example of the third exemplary embodiment is described. The injection molding unit 1 had mold clamping force of 180 t, an injection volume of 160 cc, and a screw diameter of φ36. The injection unit 2 had a load cell, and the resin pressure applied to the screw 4 was feedback-controlled by driving of the screw 4 in the front-rear direction. The mold 10 had two cavities, the first cavity 13 had a volume of 60 cc, and the second cavity 14 had a volume of 30 cc. The fixed mold 11 of the mold 10 had the hot runner 16, and the resin flow path 15 had a diameter of φ8. The first gate valve 22 was disposed in the gate of the first cavity 13, and the second gate valve 23 was installed in the gate of the second cavity 14. A valve pin was used for the gate valve. The valve pin was coupled to a piston disposed in a cylindrical hole in the fixed mold 11. The gate valve control unit 24 had a configuration in which compressed air was sent to the cylinder to advance or retreat the piston and the valve pin coupled to the piston.

The resin flow path switching valve 32 illustrated in FIG. 4A to 4D was disposed in the resin flow path 15 connecting the first cavity 13 and the second cavity 14. An outer periphery of a bottom surface of the groove 53 in the valve body 52 of the resin flow path switching valve 32 had a diameter of φ16, and an outer periphery of a top surface of each of the convex portions 54 had a diameter of φ19.8. The valve hole 59 of the valve housing 50 on the injection unit side had a flow path diameter of φ8. Therefore, when the valve is closed, the ratio S1:S2 of the pressure receiving surfaces of the valve body 52 became nearly equal to 1:3.

The height of each of the protrusions 57 was set to 2.5 mm, and a distance between the flat surface portion 55 of the valve body 52 and the flat surface portion 56 of the valve housing 50 on the injection unit side when the valve was opened was set to 2 mm.

The diameter of the pressurizing unit 40 was set to φ8 that was equal to the diameter of the resin flow path 15 of the hot runner 16. The pressurizing unit 40 was coupled to the pressure control unit 41. A servo press including a servo motor and a ball screw was used for the pressure control unit 41. An output of the servo motor was set to 3.5 kW, and the ball screw had a diameter of φ32. A load cell to measure back pressures in the dwell pressure application and the plasticization was disposed in the servo press, and the operation of the pressurizing unit 40 was feedback-controlled based on these pressure values.

Next, processes of the performed injection molding method are described. Polystyrene was used as the resin, and temperature of the cylinder 3 and the hot runner 16 was set to 230° C. The measurement position of the screw 4 was set to 100 mm. The screw 4 was advanced from the position at an injection speed 50 mm/s. In addition, the first gate valve 22 was retreated to open only the first gate 20 of the first cavity 13 having the large volume, and the resin started to fill in the first cavity 13. At timing when the unfilled volume of the first cavity 13 became 30 cc, the second gate valve 23 was retreated to open the second gate 21 of the second cavity 14, and the resin was filled in the second cavity 14. The position of 10 mm of the screw 4 immediately before the resin reached the ends of the two cavities was defined as the switching position of the resin flow path switching valve 32.

At the same time when the screw 4 reached the switching position of the resin flow path switching valve 32, the valve body 52 of the resin flow path switching valve 32 was moved toward the injection unit by advancing the pressurizing unit 40 by 3 mm. Further, the flat surface portion 55 of the valve-body surface was caused to abut on the flat surface portion 56 of the valve housing 50 on the injection unit side, to close the resin flow path switching valve 32.

After the resin flow path 15 connecting the first cavity 13 and the second cavity 14 was divided by the resin flow path switching valve 32, the dwell pressure was applied to the first cavity 13 by the injection unit 2. The dwell pressure was set to 80 MPa, and the action time was set to 2 seconds. At the same time, the pressurizing unit 40 applied pressure to the resin accumulated in the second resin flow path 152 on the pressurizing unit side of the hot runner 16, to apply the dwell pressure to the second cavity 14 having the small volume. The dwell pressure was set to 40 MPa, and the action time was set to 3 seconds.

The advancing amount of the pressurizing unit 40 from the measurement position caused by application of the dwell pressure of 40 MPa to the second cavity 14 for 3 seconds was 18 mm.

At the same time when the dwell pressure application to the second cavity 14 was completed, the second gate valve 23 was advanced to close the second gate 21. Further, after 2 seconds from start of the dwell pressure application, the first gate 20 of the first cavity 13 was closed.

In the dwell pressure application process, the ratio S1:S2 of the pressure receiving areas of the valve body 52 in the state where the switching valve was opened was nearly equal to 1:3. The melted resin pressure P1 of the second resin flow path 152 on the pressurizing unit side inside the hot runner 16 in 2 seconds at the beginning of the dwell pressure application process in which the dwell pressure was applied to the first cavity and the second cavity, was 40 MPa. The melted resin pressure P2 of the first resin flow path 151 on the injection unit side was 80 MPa. In the remaining 1 second when the dwell pressure was applied only to the second cavity, the melted resin pressure P1 was 40 MPa, and the melted resin pressure P2 was 80 MPa to 50 MPa. Accordingly, in 3 seconds of the entire dwell pressure application process, the condition to maintain the valve body of the resin flow path switching valve 32 in the closed state of P1×S1≥P2×S2 was satisfied, the state where the switching valve was closed was maintained.

Next, the melted resin pressure P1 of the second resin flow path 152 on the pressurizing unit side was reduced by retreating the pressurizing unit 40 by 3 mm. The melted resin pressure P1 became 0 MPa by the operation.

Next, the screw 4 was rotated at 100 rpm to plasticize the resin for the next injection molding. In this operation, the back pressure of the injection unit 2 was set to 5 MPa. The screw 4 was feedback-controlled and operated by the injection unit 2 to maintain the melted resin pressure P2 of the first resin flow path 151 on the injection unit side at 5 MPa. In this operation, since the ratio S1:S2 of the pressure receiving areas of the valve body 52 in the state where the switching valve was closed was nearly equal to 1:3, an expression of P1×S1<P2×S2 that was the condition to open the switching valve was satisfied, and the switching valve was opened.

Meanwhile, the back pressure of the pressurizing unit 40 retreated by 3 mm was also set to 5 MPa. Since the pressure was applied to the resin inside the resin flow path 15 by the rotation of the screw 4, the pressurizing unit 40 was feedback-controlled and operated by the pressure control unit 41 such that the pressure applied to the pressurizing unit 40 became 5 MPa. The position where the front end of the pressurizing unit 40 came out from the resin flow path 15 of the hot runner 16 was defined as the retreating limit, the maximum stroke amount was set to 30 mm, and the pressurizing unit 40 was controlled to stop at the position of 20 mm from the retreating limit.

After the pressurizing unit 40 was stopped at the set position, the rotation of the screw 4 was stopped and the measurement process was completed when the screw 4 reached the measurement set position of 100 mm. Then, after a lapse of the cooling set time of 5 seconds, the mold was opened and the molded articles were taken out.

According to the exemplary embodiments of the present disclosure, it is possible to reduce the molding cycle time. In addition, it is possible to prevent the cost from increasing.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-235225, which was on filed Dec. 25, 2019 and which is hereby incorporated by reference herein in its entirety.

What is claimed is:

1. A mold including a first cavity and a second cavity, the mold comprising:
   a hot runner that forms a flow path to inject a resin injected from an injection unit into the first cavity and the second cavity; and
   a switching valve configured to divide the flow path into a first path connected to the first cavity and a second path connected to the second cavity,
   wherein the injection unit is connected to the first path,
   wherein a pressurizing unit is connected to the second path,
   wherein the switching valve includes a valve body disposed inside the flow path,
   wherein the valve body includes a first surface, a second surface, and a third surface connecting the first surface and the second surface,
   wherein the third surface has a groove and projected portions,
   wherein the first surface has three or more protrusions,
   wherein the first surface and the second surface respectively face the second path and the first path, and
   wherein a pressure receiving area of the first surface that receives pressure from melted resin in the second path is larger than a pressure receiving area of the second surface that receives pressure from melted resin in the first path.

2. The mold according to claim 1, wherein the first cavity and the second cavity are different in volume.

3. The mold according to claim 1, further comprising:
   a first gate valve which opens and closes a first gate between the first path and the first cavity; and
   a second gate valve which opens and closes a second gate between the second path and the second cavity.

4. The mold according to claim 1, further comprising a pressure control unit coupled to the pressurizing unit, wherein the pressurizing unit is advanced and retreated by the pressure control unit.

5. The mold according to claim 1, further comprising a valve control unit which controls the switching valve to block and communicate between the first path and the second path.

6. The mold according to claim 1, wherein a volume of the first cavity is larger than a volume of the second cavity.

7. The mold according to claim 1, wherein a volume of the second cavity is larger than a volume of the first cavity.

8. The mold according to claim 1, wherein the switching valve includes a valve body, wherein the switching valve is configured to block and communicate between the first path and the second path by the valve body being pushed and moved by melted resin.

9. The mold according to claim 1, wherein the flow path includes a third path, and the injection unit is connected to the first path through the third path.

10. The mold according to claim 9, wherein the injection unit is connected to the second path through the third path and the switching valve.

11. The mold according to claim 1, wherein the pressurizing unit is a plunger.

12. The mold according to claim 1, further comprising a gate valve which opens and closes a gate between the second path and the second cavity by moving the gate valve in a first direction, wherein the pressurizing unit moves in a second direction not in parallel with the first direction.

13. A method of manufacturing an article comprising: injecting a resin into a cavity of a mold from an injection unit, wherein the mold is the mold according to claim 1.

14. The method according to claim 13, further comprising:
   dwelling a resin in the first cavity with a feedback control of the injection unit; and
   dwelling a resin in the second cavity with a feedback control of the pressurizing unit.

* * * * *